United States Patent
Young et al.

(10) Patent No.: US 7,688,803 B1
(45) Date of Patent: Mar. 30, 2010

(54) SYSTEM AND METHOD FOR COORDINATING BETWEEN MULTIPLE TELEPHONY CHANNELS

(76) Inventors: Steven J. Young, 105 Milani Ct., Los Gatos, CA (US) 95030; Todd Krein, 1180 McKendrie St., San Jose, CA (US) 95126; Stephen G. Perlman, 1107 Hamilton Ave., Palo Alto, CA (US) 94301

( * ) Notice: Subject to any disclaimer, the term of this patent is extended or adjusted under 35 U.S.C. 154(b) by 2193 days.

(21) Appl. No.: 10/261,761

(22) Filed: Sep. 30, 2002

Related U.S. Application Data

(63) Continuation-in-part of application No. 09/653,964, filed on Sep. 1, 2000, now abandoned.

(51) Int. Cl.
*H04L 12/66* (2006.01)

(52) U.S. Cl. .................. 370/352; 370/401; 370/338

(58) Field of Classification Search ........... None
See application file for complete search history.

(56) References Cited

U.S. PATENT DOCUMENTS

| | | |
|---|---|---|
| 4,944,008 A | 7/1990 | Piosenka et al. |
| 5,146,325 A | 9/1992 | Ng |
| 5,230,019 A | 7/1993 | Yanagimichi et al. |
| 5,371,551 A | 12/1994 | Logan et al. |
| 5,444,491 A | 8/1995 | Lim |
| 5,495,246 A | 2/1996 | Nichols et al. |
| 5,515,373 A | 5/1996 | Lynch et al. |
| 5,574,964 A | 11/1996 | Hamlin |
| 5,584,023 A | 12/1996 | Hsu |
| 5,627,539 A | 5/1997 | Lynch et al. |
| 5,631,651 A | 5/1997 | Nichols et al. |
| 5,634,074 A | 5/1997 | Devon et al. |
| 5,650,831 A | 7/1997 | Farwell |
| 5,721,727 A | 2/1998 | Ashi |
| 5,721,827 A | 2/1998 | Logan et al. |
| 5,727,233 A | 3/1998 | Lynch et al. |
| 5,732,216 A | 3/1998 | Logan et al. |
| 5,734,589 A | 3/1998 | Kostreski et al. |
| 5,734,862 A | 3/1998 | Kulas |
| 5,799,190 A | 8/1998 | Lynch et al. |
| 5,819,298 A | 10/1998 | Wong et al. |
| 5,838,873 A | 11/1998 | Blatter et al. |
| 5,862,220 A | 1/1999 | Perlman |
| 5,870,477 A | 2/1999 | Sasaki et al. |
| 5,883,869 A | 3/1999 | Tamai et al. |
| 5,892,536 A | 4/1999 | Logan et al. |
| 5,896,444 A | 4/1999 | Perlman et al. |
| 5,918,013 A | 6/1999 | Mighdoll et al. |

(Continued)

FOREIGN PATENT DOCUMENTS

EP        0 346 700 A2    12/1989

(Continued)

*Primary Examiner*—Bob A Phunkulh
(74) *Attorney, Agent, or Firm*—Kory D. Christensen; Stoel Rives LLP

(57) ABSTRACT

A system comprising: an IP telephony interface communicatively coupled to an IP telephony service; a secondary telephony interface communicatively coupled to a secondary telephony service; and a telephone connection module to select between the IP telephony service and the secondary telephone service based on one or more specified telephony connection conditions.

20 Claims, 7 Drawing Sheets

U.S. PATENT DOCUMENTS

| | | | |
|---|---|---|---|
| 5,931,949 A | 8/1999 | Perlman et al. | |
| 5,938,748 A | 8/1999 | Lynch et al. | |
| 5,940,073 A | 8/1999 | Klosterman | |
| 5,963,909 A | 10/1999 | Warren et al. | |
| 5,978,381 A | 11/1999 | Perlman et al. | |
| 5,983,273 A | 11/1999 | White et al. | |
| 5,986,692 A | 11/1999 | Logan et al. | |
| 6,005,938 A | 12/1999 | Banker et al. | |
| 6,014,693 A | 1/2000 | Ito et al. | |
| 6,014,694 A | 1/2000 | Aharoni et al. | |
| 6,023,585 A | 2/2000 | Perlman et al. | |
| 6,026,079 A | 2/2000 | Perlman | |
| 6,044,396 A | 3/2000 | Adams | |
| 6,049,694 A | 4/2000 | Kassatly | |
| 6,072,872 A | 6/2000 | Chang et al. | |
| 6,073,168 A | 6/2000 | Mighdoll et al. | |
| 6,084,583 A | 7/2000 | Gerszberg et al. | |
| 6,088,455 A | 7/2000 | Logan et al. | |
| RE36,801 E | 8/2000 | Logan et al. | |
| 6,097,733 A * | 8/2000 | Basu et al. | 370/468 |
| 6,108,422 A | 8/2000 | Newby et al. | |
| 6,118,498 A | 9/2000 | Reitmeier | |
| 6,134,590 A | 10/2000 | Perlman | |
| 6,138,147 A | 10/2000 | Weaver et al. | |
| 6,141,356 A | 10/2000 | Gorman | |
| 6,141,693 A | 10/2000 | Perlman et al. | |
| 6,169,879 B1 | 1/2001 | Perlman | |
| 6,188,397 B1 | 2/2001 | Humpleman | |
| 6,199,076 B1 | 3/2001 | Logan et al. | |
| 6,199,114 B1 | 3/2001 | White et al. | |
| 6,226,241 B1 | 5/2001 | D'Amato et al. | |
| 6,233,389 B1 | 5/2001 | Barton | |
| 6,360,368 B1 | 3/2002 | Chawla | |
| 6,366,731 B1 | 4/2002 | Na et al. | |
| 6,505,299 B1 | 1/2003 | Zeng et al. | |
| 6,526,580 B2 | 2/2003 | Shimomura et al. | |
| 6,578,070 B1 | 6/2003 | Weaver et al. | |
| 6,580,710 B1 * | 6/2003 | Bowen et al. | 370/353 |
| 6,603,488 B2 | 8/2003 | Humpleman | |
| 6,611,503 B1 | 8/2003 | Fitzgerald et al. | |
| 6,711,160 B2 * | 3/2004 | Chan et al. | 370/354 |
| 6,778,646 B1 * | 8/2004 | Sun | 379/93.05 |
| 6,934,258 B1 * | 8/2005 | Smith et al. | 370/238 |
| 2001/0046237 A1 * | 11/2001 | Chan et al. | 370/419 |

FOREIGN PATENT DOCUMENTS

| | | |
|---|---|---|
| EP | 0 364 229 A2 | 4/1990 |
| EP | 0 512 398 A2 | 11/1992 |
| EP | 0 666 694 A1 | 8/1995 |
| EP | 0 676 761 A1 | 10/1995 |
| EP | 0 693 727 A1 | 1/1996 |
| EP | 0 714 204 A2 | 5/1996 |
| EP | 0 749 244 A2 | 12/1996 |
| EP | 0 753 964 A1 | 1/1997 |
| EP | 0 756 393 A1 | 1/1997 |
| EP | 0 773 681 A2 | 5/1997 |
| EP | 0 903 738 A2 | 3/1999 |
| EP | 0 911 962 A1 | 4/1999 |
| EP | 0 971 358 A2 | 1/2000 |
| EP | 1 018 835 A2 | 7/2000 |
| EP | 1 032 195 A2 | 8/2000 |
| EP | 1 056 279 A1 | 11/2000 |
| EP | 01 079 581 A2 | 2/2001 |
| EP | 1 143 722 A1 | 10/2001 |
| GB | 2 333 017 A | 7/1999 |
| WO | WO 99/33265 | 7/1991 |
| WO | WO 96/08912 | 3/1996 |
| WO | WO 99/22513 A2 | 5/1999 |
| WO | WO 00/01149 A1 | 1/2000 |
| WO | WO 00/51129 | 8/2000 |
| WO | WO 01/04893 A1 | 1/2001 |
| WO | WO 01/11865 A1 | 2/2001 |
| WO | WO 01/37546 A6 | 5/2001 |
| WO | WO 01/74079 A1 | 10/2001 |

* cited by examiner

SYSTEM AND METHOD FOR COORDINATING BETWEEN MULTIPLE TELEPHONY CHANNELS

PRIORITY

This application is a continuation in part of the co-pending application entitled MULTIMEDIA AND COMPUTING SYSTEM, filed Sep. 1, 2000 now abandoned (Ser. No. 09/653,964).

BACKGROUND

1. Field of the Invention

This invention relates generally to the field of telephony systems. More particularly, the invention relates to a system for coordinating among multiple telephony communication channels.

2. Description of the Related Art

For many years, the "Plain Old Telephone Service" or "POTS" (also referred to as the "Public Switched Telephone Network" or "PSTN") offered by AT&T and later the "baby bells," was the only telephone service available to the consumer. With the rapid advances in digital communications technology over the past several years, however, consumers now have a variety of choices for telephone services in lieu of, or in addition to, POTS.

IP telephony service, for example, is becoming an increasingly popular alternative to POTS. As its name suggests, IP telephony refers to the two-way transmission of audio over a packet-switched TCP/IP network. It is also commonly referred to as "Voice Over IP," or "VoIP." Today, users typically sign up for IP telephony service through their local cable companies. However, in the future, the IP telephony service may be offered by various Internet Service Providers ("ISPs").

There are several advantages to IP telephony over POTS. For example, packet networks are more scalable than traditional circuit-switched telephone networks, and they naturally integrate with all Internet-based applications. Although the backbone of the telephone network has been converted to digital for some time, the circuit-switched nature of the PSTN is wasteful. Even though one person talks and the other listens, both the incoming and the outgoing channels are dedicated for the duration of the conversation. In addition, newer audio codecs reduce the required bitrate from the traditional 64 Kbps (i.e., with PCM) down to 8 Kbps and below, while maintaining the same level of quality. As a result, the digital bandwidth for voice over IP may be less than 1/16th that of the POTS.

One major problem with current IP telephony systems, however, is that the IP telephony device at the user's home (often a computer) must be powered in order to operate. As such, current IP telephony systems are incapable of providing a "lifeline" service, i.e., one which will be available to users at all times, even when power outages occur. Users must therefore subscribe to the basic "primary line service" offered by their local telephone company in addition to the IP telephony service. Currently, however, there are no systems capable of coordinating between the two different telephony services.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the present invention. It will be apparent, however, to one skilled in the art that the invention may be practiced without some of these specific details. In other instances, well-known structures and devices are shown in block diagram form to avoid obscuring the underlying principles of the invention.

Prior to describing embodiments of the system and method for coordinating between multiple telephony channels, which is the focus of this application, an overview of an exemplary multimedia storage and playback system is provided. It should be noted, however, that many of the specific details of the multimedia system set forth below are not necessary for implementing the underlying principles of the invention.

Embodiments of the exemplary multimedia system are set forth in the co-pending application entitled MULTIMEDIA AND COMPUTING SYSTEM, filed Sep. 1, 2000 (Ser. No. 09/653,964), which is assigned to the assignee of the present application and which is incorporated herein by reference.

System Overview

Figure 1:
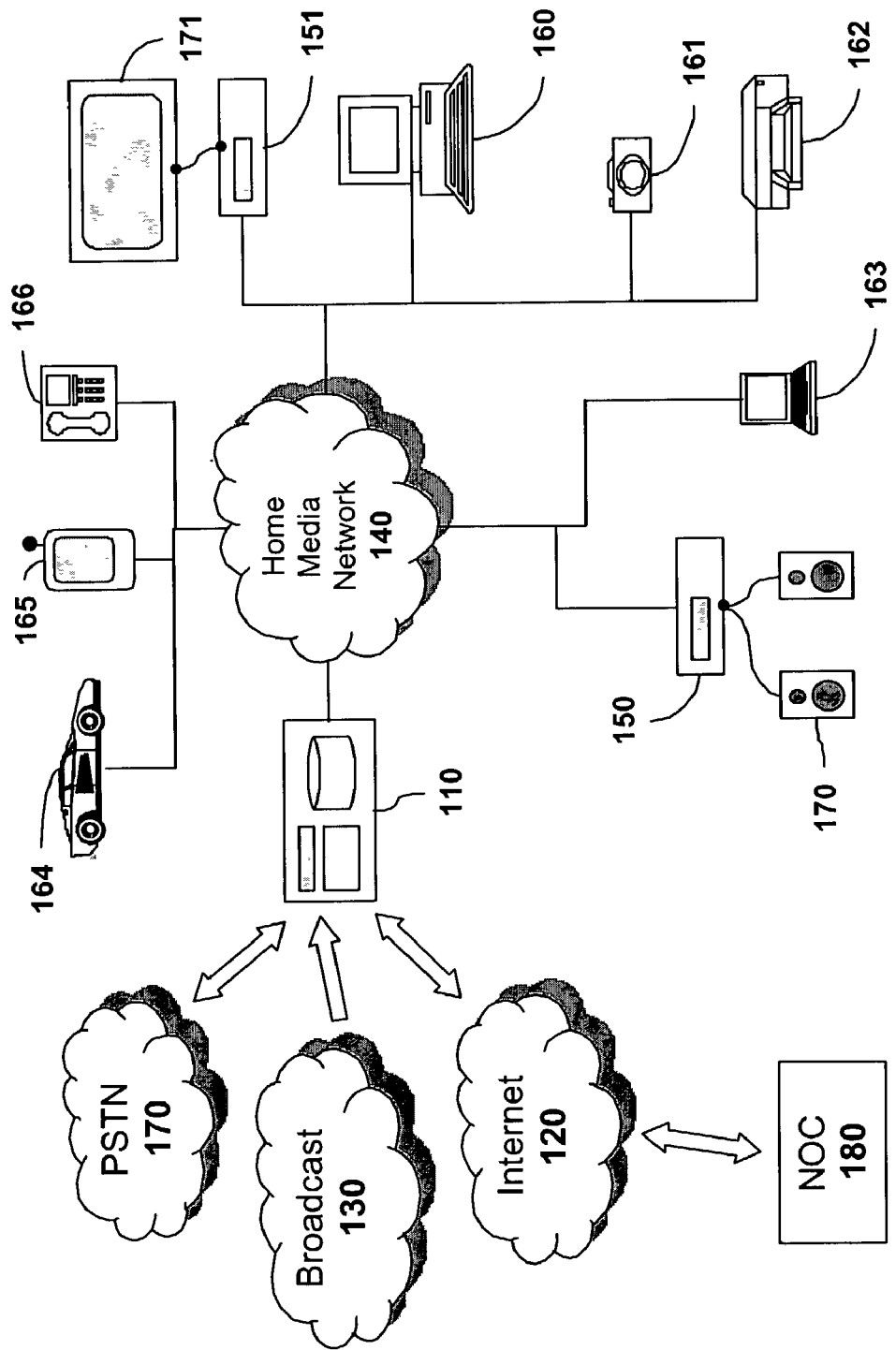
FIG. 1 illustrates a network architecture for implementing embodiments of the invention.

As illustrated in FIG. 1, in one embodiment of the invention, a digital media server 110 equipped with a processor and a mass storage device acts as a central repository for decoding, storing and distributing multimedia content and data. More particularly, the digital media server 110 coordinates multimedia content from Internet communication channels 120 (e.g., DSL, cable Internet), broadcast communication channels 130 (e.g., digital/analog cable, satellite), and/or Public Switched Telephone Network ("PSTN") communication channels 170 (i.e., standard telephone) to provide a stable, real-time home media network 140 for a plurality of network devices 150-151, 160-166.

Numerous digital and analog devices may be configured to communicate with the home media server 110 over the home media network 140. By way of example, and not limitation, these include personal computers 160, cameras or digital camcorders 161, printers 162, notebook computers 163, automotive audio/video systems 164, cell phones or personal digital assistants 165, standard telephones 166 (including fax machines), home security systems (not shown); and/or home climate control systems (not shown).

In one embodiment, complex multimedia and data processing such as is tuning to selected channels, recording of specified programs/music, storing phone numbers and personal data, connecting to remote network sites, etc., is performed at the media server 110, rather than at the individual network devices 150, 151; 160-166. As such, these devices 150, 151; 160-166 may be manufactured relatively inexpensively. For example, multimedia nodes 150, 151 may be equipped with just enough processing power and memory to receive and play back a multimedia signal, with storage and control (e.g., tuning) functions offloaded to the home media server 110. Similarly, a telephone 166 may be designed with nothing more than a low power microcontroller coupled to an RF transmitter, with telephony functions and contact data storage provided by the home media server 110. In addition, because these network devices 160-166 do not require as much circuitry, they will be lighter than currently-existing devices, and will consume less power.

In one embodiment, the primary communication medium over which the home media server 110 and the various devices 150-151, 160-166 communicate is wireless RF (e.g., via network module 240), with terrestrial transport connections such as Ethernet reserved for devices which are not within RF m transmission range. Moreover, certain devices which require a substantial amount of home media network 140 bandwidth (e.g., high definition television 171), and/or devices which are in close proximity to the media server 110 may be configured to communicate over terrestrial transports, depending on the requirements of the particular configuration.

Telephony Embodiments

Figure 2:
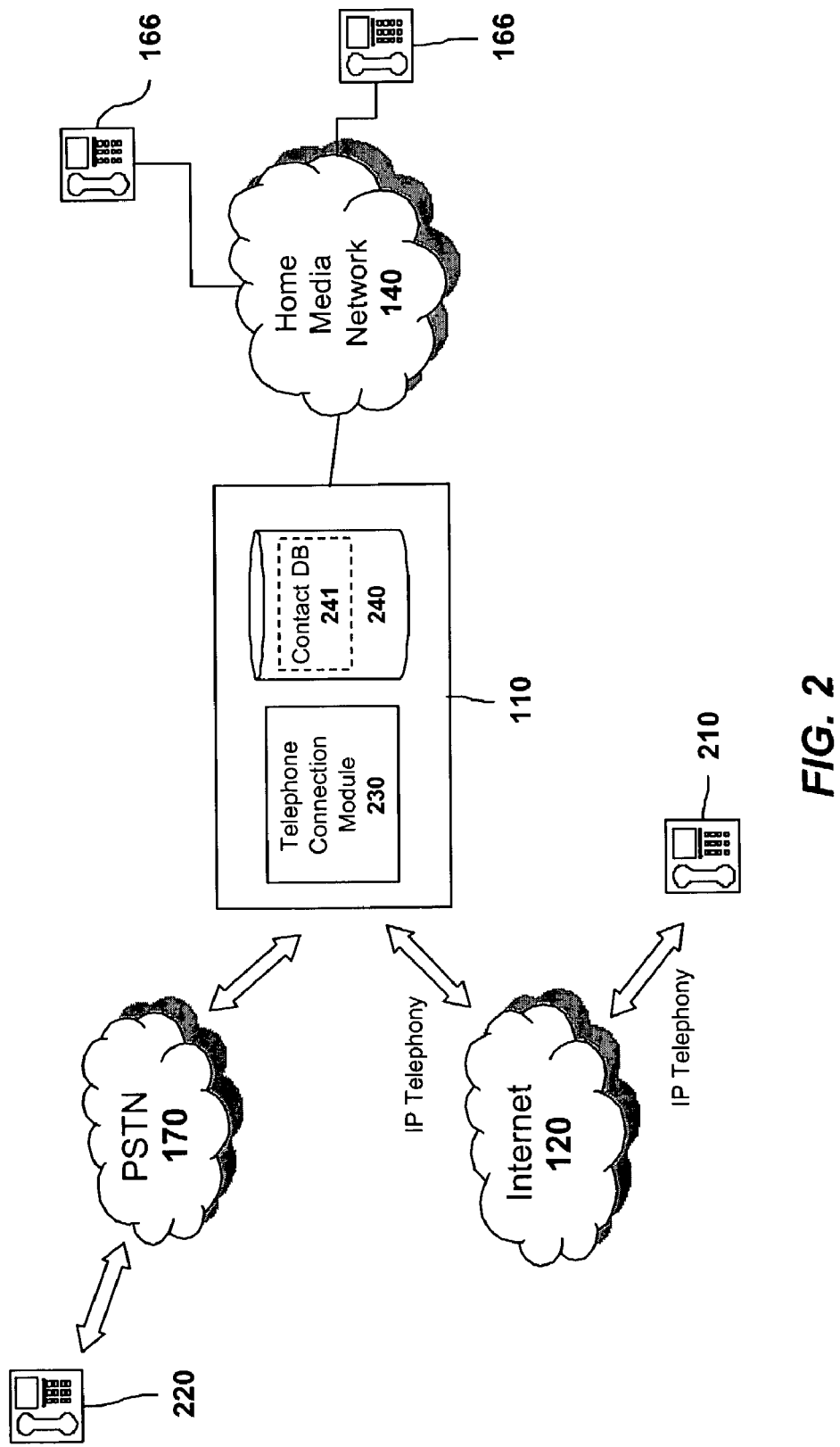
FIG. 2 illustrates one embodiment of a home media server for coordinating between standard telephone services and IP telephone services.

As illustrated in FIG. 2, in one embodiment, home telephone devices 166 may also be configured to run through the home media server 110. In this embodiment, incoming faxes and voicemail are stored on the home media storage device 240 and may be accessed from any room in the house (e.g. from telephone devices 166, personal computers 160, PDAs 165, and/or video systems 151/171). In addition, phone number and address information may be stored in a contact database 241 on the storage device 240 of the home media server 110 and accessed through the various telephone devices 166 (or other home media devices). Offloading user contact data from the telephone devices 166 in this manner allows telephone devices 166 to be manufactured will less memory and less processing power, further decreasing costs to the end user.

As illustrated in FIG. 2, in one embodiment, the home media server 110 includes a telephone connection module 230 which coordinates between standard telephony calls placed/received over the public switched telephone network ("PSTN") 170 and calls placed over the Internet 120 using IP telephony protocols. The telephone connection module 230 automatically routes incoming to calls from both sources to the same set of home telephone devices 166 (or other home media devices such as the user's personal computer 160).

Users may specify whether a particular outgoing call should be placed over the Internet 120 (e.g., to an IP telephony device 210) or over the PSTN 170 (e.g., to a standard telephone device 220). In one embodiment, the telephone connection module 230 analyzes each outgoing telephone connection request to determine whether the call should be routed through the Internet 120 or through the PSTN 170. The telephone connection module 230 may factor in various types of connection data to make telephone connection determinations. For example, a user may specify certain contacts within the contact database 241 for which IP telephone connections should be used and certain contacts for which standard telephone connections should be used. In one embodiment, the telephone connection module 230 will select a particular connection based on whether it is the least expensive option for the user (e.g., for contacts with both IP and standard telephone capabilities). Another variable which may be factored into the selection process is the connection throughput available to the user over the Internet. More specifically, the telephone connection module 230 may initially test the connection throughput (including the availability of a reliable connection) over the Internet 120 and place an IP telephony call only if some minimum level of throughout/reliability is available. Any of the foregoing variables, alone or in combination, may be evaluated by the telephony connection module 230 to select and appropriate telephone connection.

Figure 3:
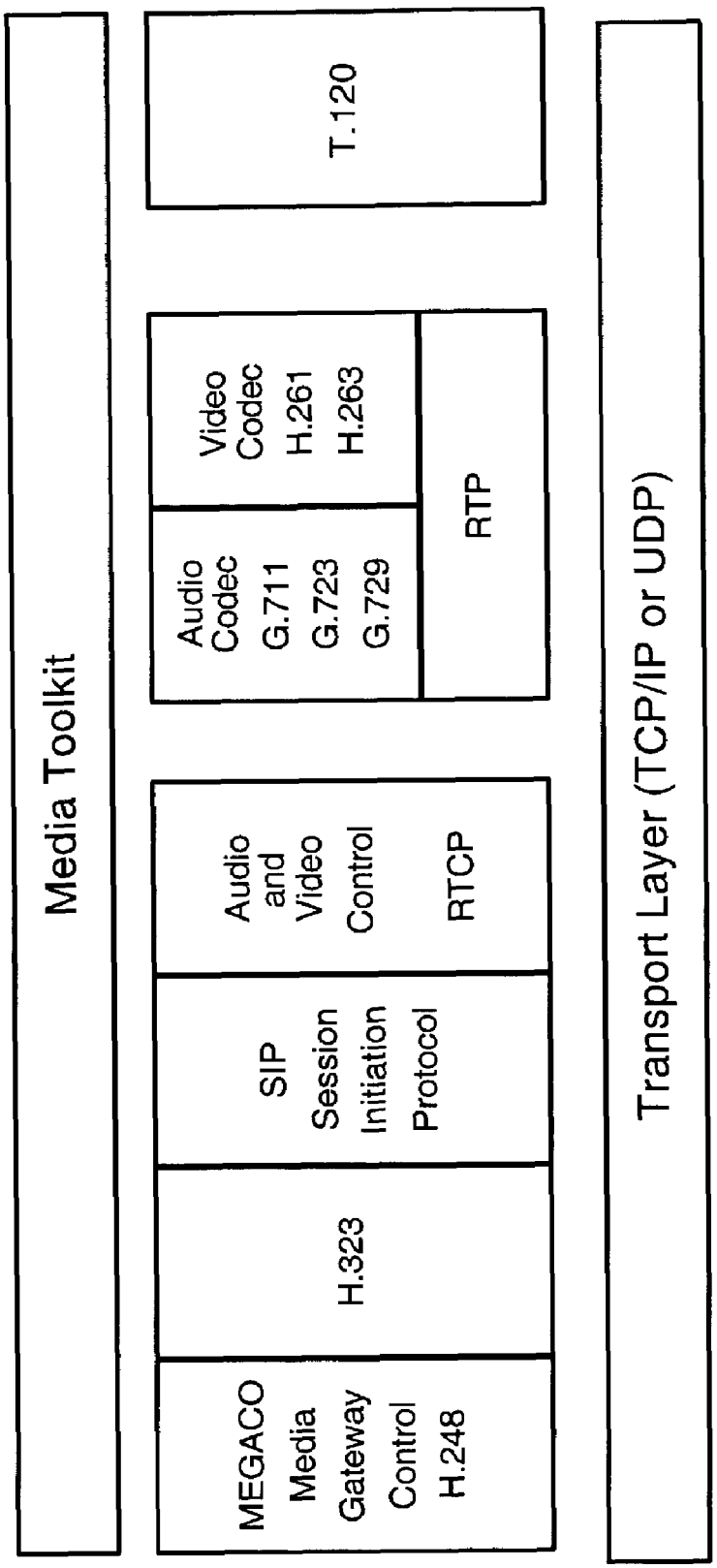
FIG. 3 illustrates one embodiment of a software architecture for implementing standard telephone, IP telephone and/or video conferencing.

One embodiment of a protocol architecture for supporting IP telephony and related communication functions on the home media server 110 is illustrated in FIG. 3. Various telecommunication standards are supported by this embodiment, including the H.248 media gateway control standard ("MEGACO") standard; the ITU-T H.323 and session initiation protocol ("SIP") standards for multimedia videoconferencing on packet-switched networks; the Realtime Control Protocol ("RTCP") standard—a companion protocol to the realtime transport protocol ("RTP") (described above) used to maintain a minimum QoS; and the ITU T.120 standard for realtime data conferencing (sharing data among multiple users).

In addition, various audio and video codecs are supported by the illustrated embodiment, including G.711, G.723, and G.729 (for audio); and H.261 and H.261 (for video). As illustrated, each of these codecs may be executed above RTP, an IP protocol that supports realtime transmission of voice and video. Each of the foregoing IP communication protocols may be utilized by media server 110 application programs through the programming interfaces of the media toolkit.

It should be noted that, although the embodiment illustrated in FIG. 3 includes a specific set of communication protocols, various other communication protocols may be implemented within the home media server 110 while still complying with the underlying principles of the invention. For example, in one embodiment, new protocol stacks (both proprietary and industry-standard) may to be installed on the home media server 110 as they become available.

Figure 4:
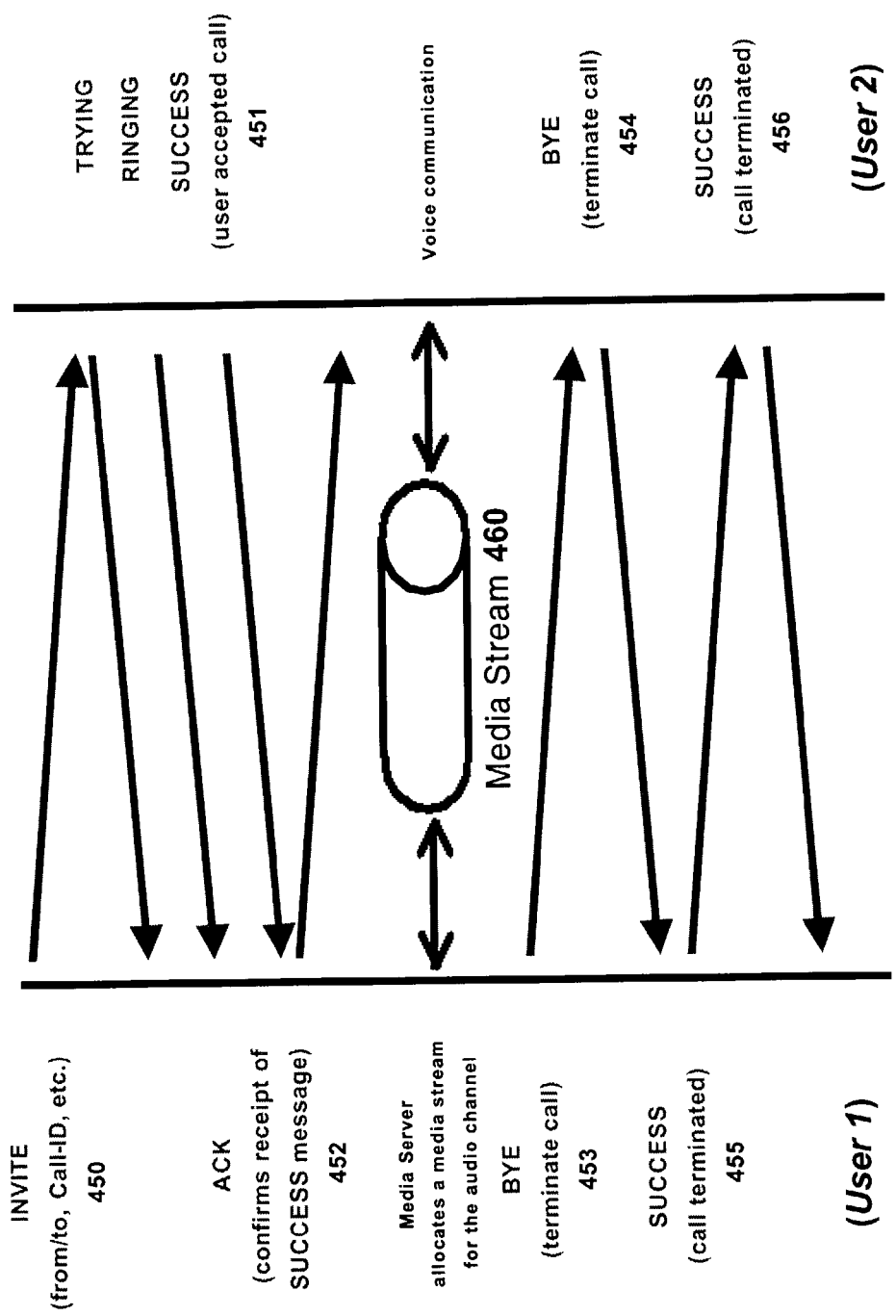
FIG. 4 illustrates a signal diagram of communication between a home media server and telephone.

FIG. 4 illustrates a signal diagram representing the set up and termination of a telephony connection according to one embodiment of the home media server 110. At 450, the home media server transmits a call connection "invitation" on behalf of User 1 to User 2. Once User 2 accepts the call, a "success" message is transmitted back to the home media server 110 at 451. In response, the home media server 110 acknowledges receipt of the "success" message at 452 and allocates a media stream 460 to support bi-directional audio communication between User 1 and User 2. To tear down the media stream 460, one of the users must hang up the phone, resulting in a "bye" message 453, 454 followed by a termination acknowledgement ("success") from both sides 455, 456.

Figure 5:
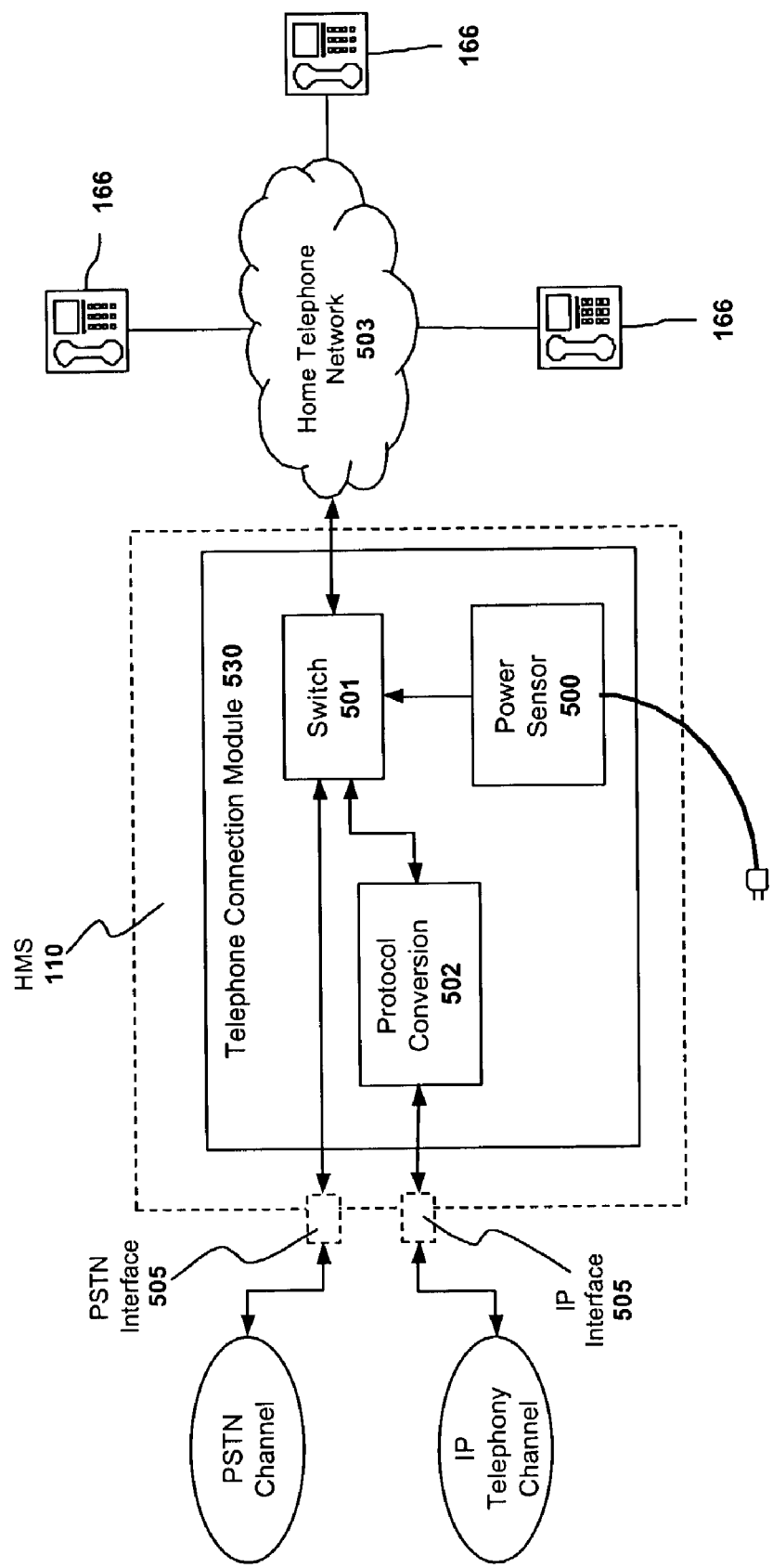
FIG. 5 illustrates one embodiment of a telephone connection module for switching between PSTN channel and an IP telephony channel.

FIG. 5 illustrates one embodiment of the telephony connection module 530 comprised of a protocol conversion module 502, a power sensor 500 and a switch 501. The power sensor 500 provides a first switching signal to the switch 501 when power to the home media server 110 drops below a threshold value. Conversely, the power sensor 500 provides a second switching signal to the switch 501 when power to the home media server 110 rises above a specified threshold value.

In response to the first switching signal the switch 501 couples the standard PSTN channel to the home telephone network 503, thereby providing primary line service across the home telephone network 503 in the event of a power outage. In response to the second switching signal, the switch 501 couples the IP telephony channel to the home telephone network 503, thereby providing IP telephony service when the home media server 110 is powered.

As indicated in FIG. 5, the PSTN channel is coupled to the home media server 110 via a PSTN interface 504 (e.g., an RJ-11 interface). Likewise, the IP telephony channel is coupled to the home media server 110 via an IP interface 505 (e.g., a coaxial cable from the cable company).

In one embodiment, the home telephone network 503, at the physical layer, employs the standard PSTN wiring within the user's home (i.e., RJ-11 wiring). Alternatively, or in addition, any of the communication channels of the home media network 140 described herein may be employed at the physical layer (e.g., coaxial cable, wireless, . . . etc).

Regardless of the particular physical layer employed for the home telephone network 503, in one embodiment, the Home Phoneline Network Alliance ("HPNA") standard is employed above the physical layer. As it is known in the art, HPNA describes a protocol for delivering IP data over telephone lines in the home. A variant of HPNA is HPNA-C in which similar protocols are used, but the home's coaxial wiring is used at the physical layer rather than phone lines.

Accordingly, when the home media server 110 is powered, and the switch 501 couples the IP telephony channel to the home telephone network 503, IP packets from the IP telephony channel are routed to the various telephony devices 166 using the HPNA standard. In one embodiment, if the network protocol stack employed by the IP telephony channel is not directly compatible with HPNA, a protocol conversion module 502 initially converts the packetized data to an HPNA-compatible format. For example, at the data-link layer, the IP packets from the IP telephony connection may be received within a different frequency block than the frequency block within which HPNA operates. As such, the IP telephony signal may need to be frequency-shifted before being supplied to the home telephony network 503 (i.e., if HPNA is used as the IP transmission protocol). In addition, if the IP telephony connection requires a different codec, or uses a different type of quality of service (QoS), the protocol conversion module 502 may be required to convert these features of the signal. Similarly, the protocol conversion module may convert between different packet sizes employed by HPNA and the IP connection.

Figure 6:
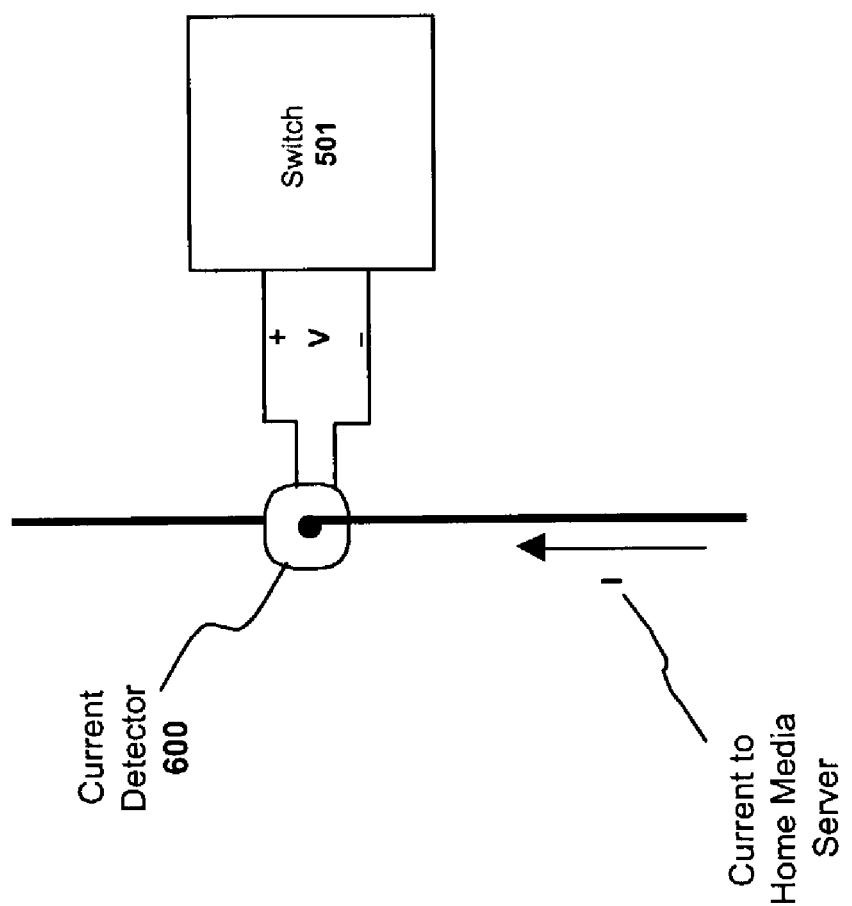
FIG. 6 illustrates a power sensor according to one embodiment of the invention.

In one embodiment, the power sensor 500 is comprised of a current detector 600 such as that illustrated in FIG. 6. The current detector 600 outputs a voltage V which is proportional to the current 601 being used by the home media server 110. Thus, if the current drops below a specified value, indicating a concomitant decrease in power consumption, then the voltage generated by the current sensor 600 drops below a corresponding voltage level. In response, the switch 501 couples the standard PSTN channel to the home telephone network 503, thereby providing primary line service across the home telephone network 503. Similarly, when power is restored and the voltage level rises above some specified value, the switch 501 couples the IP telephony channel to the home telephone network 503. It should be noted that various alternate circuits for switching between the IP telephony channel and the PSTN channel may be employed while still complying with the underlying principles of the invention (e.g., a relay; a Hall sensor; a voltage drop over a small sensing resistor; . . . etc).

For example, in one embodiment, the "switch" is a simple relay, normally closed. That is, if no power is available to the home media server 110, the relay falls closed, and connects to the PSTN. If power is available, the relay is energized, and thus disconnects from the PSTN. When disconnected from the PSTN, the IP telephony connection is employed.

In one embodiment, both the PSTN channel and the IP telephony channel may be coupled to the home telephone network at the same time. For example, because HPNA operates at frequencies well above those used by PSTN, both PSTN and IP telephony transmitted via HPNA may share the same transmission medium. Thus, in this embodiment, instead of employing a switch to select between PSTN and IP telephony at the home media server 110, a power sensor (or other sensor to detect the HPNA signal) and switch may be provided at each of the telephony devices 166 within the user's home.

Figure 7:
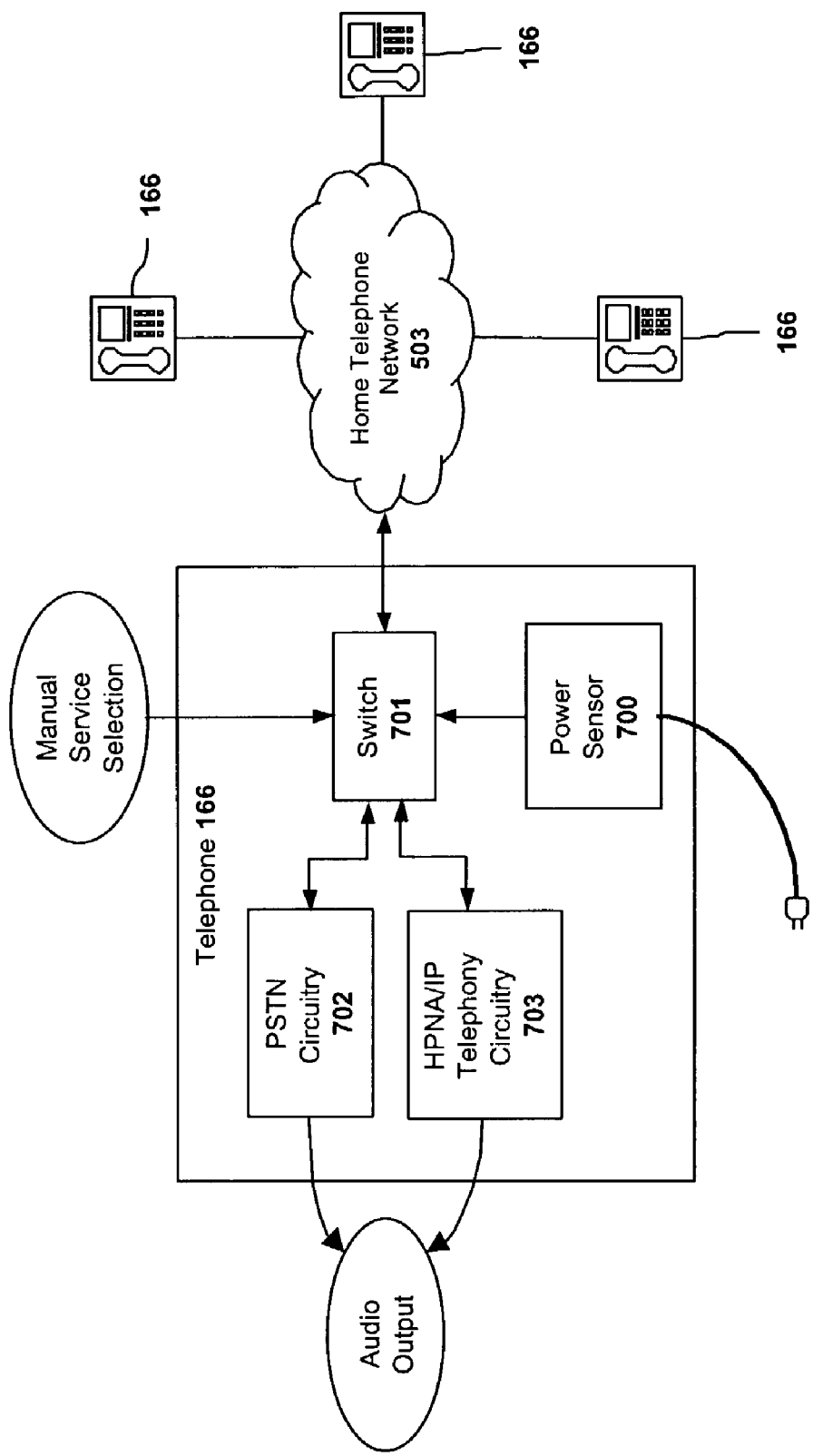
FIG. 7 illustrates a telephone equipped with a power sensor and a switch for switching between different telephony communication channels.

As illustrated in FIG. 7, one embodiment of such a telephony device 166 is comprised of a power sensor 700 to detect whether the telephony device 166 is powered (e.g., plugged in to an AC outlet). The power sensor 700 provides a first switching signal to the switch 701 when power to the telephony device 166 drops below a threshold value and a second switching signal to the switch 701 when power provided to the telephony device 166 rises above a specified threshold value.

In response to the first switching signal the switch 701 couples the home telephone network 503 to PSTN circuitry/logic 702 within the telephony device 166, thereby coupling the primary line signal to the telephony device 166. In response to the second switching signal, the switch 701 couples the home telephone network 503 to IP telephony circuitry/logic 703 within the telephony device 166, thereby coupling the IP telephony signal to the telephony device 166. In one embodiment, the IP telephony circuitry comprises HPNA circuitry to communicate over the home telephony network 503 according to the HPNA protocol.

While a "home media server" 110 is described above as the gateway to the home telephone network 503 for IP telephony and PSTN channels, the underlying principles of the invention may be employed on virtually any device having both an IP telephony and a PSTN interface, and a mechanism to communicatively couple one of the two interfaces to the home telephone network 503. For example, the invention may be embodied in a simple switching appliance physically coupled between the PSTN network and the home telephone network (e.g., external to the user's home at the point at which the PSTN connection is fed into the home).

Similarly, the switches in both the home media server 110 and the individual telephony devices 166 may be triggered by sensing phenomena other than power consumption. For example, in one embodiment, IP signal detection circuitry/logic or HPNA signal detection circuitry/logic is provided, either in lieu of, or in addition to the power sensor 500, to detect whether an IP telephony signal and/or an HPNA signal is present. If the IP telephony signal or HPNA signal is present, then the switch 501 provides the signal to the home telephone network 503; if not, then the switch 501 provides the PSTN signal to the home telephone network 503.

As used herein, the term "IP telephony" may refer to any telephony system in which audio data is digitized, packetized, and transmitted from a source to a destination. That is, "IP telephony" is not limited to telephony using the Internet Protocol, "IP." Various alternate protocols for packetizing data may be employed while still complying with the underlying principles of the invention.

Embodiments of the present invention include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

Elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system and method. It will be apparent, however, to one skilled in the art that the system and method may be practiced without some of these specific details. For example, while the embodiments described above detect IP telephony service based on power consumption, various alternate mechanisms for detecting IP telephony service may be employed. Accordingly, the scope and spirit of the invention should be judged in terms of the claims which follow.

What is claimed is:

1. A system comprising:
    a server comprising:
        an IP telephony interface communicatively coupled to an IP telephony service;
        a secondary telephony interface communicatively coupled to a secondary telephony service;
        a telephone connection module to select between the IP telephony service and the secondary telephone service based on one or more specified telephony connection conditions
        a server RF transmitter communicatively coupled to the telephone connection module and configured to transmit a multimedia signal rendered by the server and based on audio received from the selected telephone service;
    a plurality of clients communicatively coupled to the server, each client comprising:
        a client RF transmitter to communicatively couple to the server RF transmitter and configured to receive the multimedia signal; and
        a microcontroller configured to play back the multimedia signal.

2. The system as in claim 1 wherein one of the specified telephony connection conditions comprises sensing that power required to support the IP telephony service is below a predetermined threshold value.

3. The system as in claim 2 further comprising:
    a power sensor to sense whether power required to support the IP telephony service is below the predetermined threshold value.

4. The system as in claim 3 wherein the power sensor comprises:
    a current detector to measure current consumed by an IP telephony device.

5. The system as in claim 1 wherein the secondary service is the Public Switched Telephone Network ("PSTN").

6. The system as in claim 1 further comprising:
    a home telephony network interface to a home telephony network, wherein the telephone connection module couples either the IP telephony service or the secondary telephone service to the home telephony network responsive to selecting either the IP telephony service or the secondary telephone service.

7. The system as in claim 6 further comprising:
    a protocol conversion module to convert IP telephony data from an IP telephony protocol to a secondary network protocol for transmitting IP telephony data over the home telephony network.

8. The system as in claim 7 wherein the secondary network protocol comprises the home Phoneline Network Alliance ("HPNA") protocol.

9. The system as in claim 6 wherein coupling comprises physically coupling.

10. The system as in claim 6 wherein coupling comprises electrically coupling.

11. The system as in claim 1 wherein one of the specified telephony connection conditions comprises sensing that an IP telephony signal is present.

12. The system as in claim 1, wherein the server is configured to provide contact data storage and voicemail storage, and wherein each of the plurality of clients is configured to access the contact data storage and voicemail storage.

13. An apparatus comprising:
    IP telephony circuitry to render audio from an IP telephony channel;
    secondary telephony circuitry to render audio from a secondary telephony channel;
    a sensor to sense one or more specified telephony connection conditions;
    a switch to select between the IP telephony circuitry and the secondary telephony circuitry based on the one or more specified telephony connection conditions; and
    wherein the apparatus is configured to simultaneously couple a home telephone network to the IP telephony channel and the secondary telephony channel via the same transmission medium, the IP telephony service and the secondary telephony service operating at different frequency ranges.

14. The apparatus as in claim 13 wherein the sensor is a power sensor and wherein one of the specified telephony connection conditions comprises the power required to support the IP telephony channel dropping below a predetermined threshold value.

15. The apparatus as in claim 14 wherein the power sensor comprises:
    a current detector to measure current consumed by the IP telephony circuitry.

16. The apparatus as in claim 14 wherein the secondary channel is the Public Switched Telephone Network ("PSTN") and wherein the secondary circuitry comprises PSTN circuitry.

17. The apparatus as in claim 13 wherein the IP telephony circuitry comprises circuitry for transmitting packetized audio over the home telephone network according to the Home Phoneline Network Alliance ("HPNA") protocol.

18. The apparatus as in claim 13 wherein coupling comprises physically coupling.

19. The apparatus as in claim 13 wherein coupling comprises electrically coupling.

20. The apparatus as in claim 13 wherein one of the specified telephony connection conditions comprises sensing that an IP telephony signal is present.

* * * * *